(12) United States Patent
Andreoli-Fang et al.

(10) Patent No.: US 10,887,061 B2
(45) Date of Patent: Jan. 5, 2021

(54) SYSTEMS AND METHODS FOR PACKET SEGMENTATION IN STANDALONE SMALL CELL

(71) Applicant: CABLE TELEVISION LABORATORIES, INC, Louisville, CO (US)

(72) Inventors: Jennifer Andreoli-Fang, Boulder, CO (US); Balkan Kecicioglu, Erie, CO (US); Joseph Padden, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 49 days.

(21) Appl. No.: 15/865,085

(22) Filed: Jan. 8, 2018

(65) Prior Publication Data
US 2018/0131484 A1 May 10, 2018

Related U.S. Application Data

(63) Continuation-in-part of application No. 15/649,391, filed on Jul. 13, 2017.

(60) Provisional application No. 62/362,033, filed on Jul. 13, 2016, provisional application No. 62/405,686, (Continued)

(51) Int. Cl.
| | | |
|---|---|---|
| *H04L 5/00* | (2006.01) | |
| *H04W 72/04* | (2009.01) | |
| *H04W 24/10* | (2009.01) | |
| *H04W 72/12* | (2009.01) | |
| *H04W 84/04* | (2009.01) | |
| *H04W 88/08* | (2009.01) | |
| *H04W 28/06* | (2009.01) | |
| *H04L 1/00* | (2006.01) | |

(52) U.S. Cl.
CPC .......... *H04L 5/0044* (2013.01); *H04W 24/10* (2013.01); *H04W 72/0446* (2013.01); *H04W 72/1278* (2013.01); *H04L 2001/0097* (2013.01); *H04W 28/065* (2013.01); *H04W 84/045* (2013.01); *H04W 88/085* (2013.01)

(58) Field of Classification Search
CPC ...... H04L 5/0044; H04L 11/00; H04W 24/10; H04W 72/0446; H04W 72/1278; H04W 28/065; H04W 84/045; H04W 88/085
USPC .......................................................... 370/329
See application file for complete search history.

(56) References Cited

U.S. PATENT DOCUMENTS

| | | | | |
|---|---|---|---|---|
| 6,633,683 B1* | 10/2003 | Dinh | ........................ | G06K 9/40 345/611 |
| 2003/0016770 A1* | 1/2003 | Trans | ....................... | H04B 1/00 375/346 |

(Continued)

*Primary Examiner* — Christopher R Crompton
(74) *Attorney, Agent, or Firm* — Armstrong Teasdale LLP

(57) ABSTRACT

A radio head includes a standalone small cell configured to receive a plurality of IP packets over a series of sequential sub-frames, and generate a bandwidth report for each of the plurality of received IP packets. The radio head further includes a radio link control unit configured to sum a received bandwidth report with segmentation induced noise for each of the plurality of received IP packets, and an adaptive filter configured to apply a filter weight to each of the series of sequential sub-frames. The applied filter weight is based on (i) an output of the radio link control unit for a previous sub-frame, and (ii) an output of the adaptive filter for the previous sub-frame.

13 Claims, 9 Drawing Sheets

Related U.S. Application Data filed on Oct. 7, 2016, provisional application No. 62/443,105, filed on Jan. 6, 2017.

(56) References Cited

U.S. PATENT DOCUMENTS

| | | | |
|---|---|---|---|
| 2006/0058038 A1* | 3/2006 | Das | H04W 68/00 455/456.1 |
| 2007/0191054 A1* | 8/2007 | Das | H04B 7/022 455/525 |
| 2010/0322187 A1* | 12/2010 | Tani | H04L 1/0007 370/331 |
| 2012/0327799 A1* | 12/2012 | Sandlund | H04W 72/1221 370/252 |
| 2013/0170461 A1* | 7/2013 | Ren | H04L 1/1893 370/329 |
| 2014/0161083 A1* | 6/2014 | Nobukiyo | H04W 72/042 370/329 |
| 2014/0185428 A1* | 7/2014 | Thibeault | H04L 47/125 370/225 |
| 2014/0286258 A1* | 9/2014 | Chowdhury | H04L 1/1812 370/329 |
| 2016/0157211 A1* | 6/2016 | Kato | H04W 16/32 455/450 |
| 2016/0197660 A1* | 7/2016 | O'Keeffe | H01Q 1/246 370/329 |

\* cited by examiner

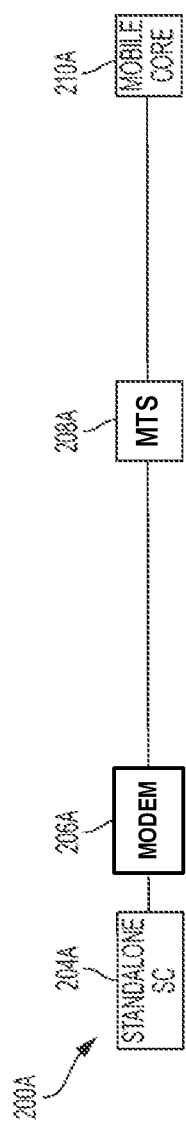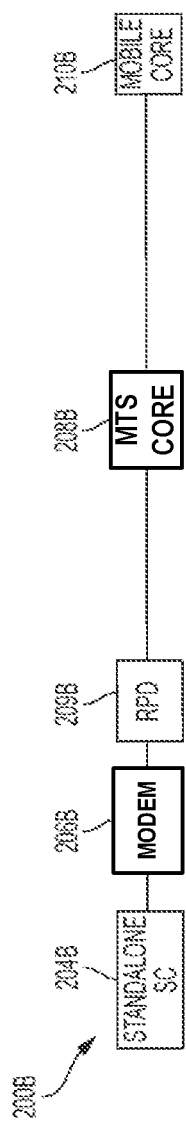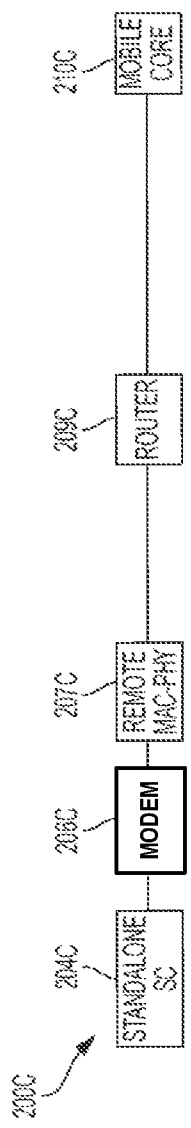

SYSTEMS AND METHODS FOR PACKET SEGMENTATION IN STANDALONE SMALL CELL

RELATED APPLICATIONS

This application is a continuation-in-part application of U.S. patent application Ser. No. 15/649,391, filed Jul. 13, 2017, which previous application claims priority to U.S. Provisional Application Ser. No. 62/362,033, filed Jul. 13, 2016, and U.S. Provisional Application Ser. No. 62/405,686, filed Oct. 7, 2016. This application also claims the benefit of and priority to U.S. Provisional Patent Application Ser. No. 62/443,105, filed Jan. 6, 2017. The respective disclosures of all of these prior applications are herein incorporated by reference in their entireties.

TECHNICAL FIELD

This disclosure relates in general to the field of communications and, more particularly, techniques for integration of wireless access and wireline networks.

BACKGROUND

Today's communication systems may include separate wireless and wireline portions, each of which may be owned and controlled by the same or different operators. Even though some operators, such as cable operators also known as Multiple System Operators ("MSOs"), use Data Over Cable Service Interface Specification ("DOCSIS") networks for backhauling Internet traffic, separate networks, such as mobile networks, DOCSIS networks, Wi-Fi networks, and radio networks have limited to no visibility into parts of the other network types. Typically, each network type, such as DOCSIS and LTE, have separate traffic scheduling algorithms. As a result, currently when these types of networks are combined, the resulting architecture may be inefficient and may result in higher latency due to internetwork visibility and communication.

SUMMARY OF THE INVENTION

In an embodiment, the present NACK unsolicited grant generating system and method is formed within and utilized by a Modem Termination System (MTS). It will be understood that an MTS may be anyone one of a CMTS, an ONT, an OLT, a Network Termination Units, a Satellite Termination Units, and other termination systems, collectively herein called a "Modem Termination System" or "MTS." The MTS in the present embodiment includes a modem termination system (MTS) receiving device for receiving a Not Acknowledge (NACK) message from centralized Small Cell (cSC). The MTS then utilizes an unsolicited grant processor for analyzing the received NACK message and generates at least one unsolicited backhaul grant. The at least one unsolicited backhaul grant is put into place within the backhaul system for the purpose of preparing the backhaul communication system to immediately forward the retransmission of a previously failed transmission.

In another embodiment, the present invention is a NACK hold generating system. The NACK hold generating system generates a backhaul hold to delay the transmission of the NACK within the backhaul system to ensure the NACK arrives at its destination at a predesignated time. One example of a predesignated time is at subframe 12 after the original failed transmission at subframe 0. The present NACK hold generating system includes a modem termination system (MTS) receiving device configure in a backhaul communication system for receiving a Not Acknowledge (NACK) message from centralized Small Cell (cSC). The MTS also includes a NACK hold processor for analyzing the received NACK message and generating at least one NACK hold instruction for delaying the transmission for the NACK at one or more of the backhaul communication systems elements.

Other embodiments contemplated utilize an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of x-hauling traffic, examples include without limitation satellite operator's communication systems, Wi-Fi networks, optical networks, DOCSIS networks, MIMO communication systems, microwave communication systems, short and long haul coherent optic systems, etc. X-hauling is defined here as any one of or a combination of front-hauling, backhauling, and mid-hauling. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In an embodiment, a radio head includes a standalone small cell configured to receive a plurality of IP packets over a series of sequential sub-frames, and generate a bandwidth report for each of the plurality of received IP packets. The radio head further includes a radio link control unit configured to sum a received bandwidth report with segmentation induced noise for each of the plurality of received IP packets, and an adaptive filter configured to apply a filter weight to each of the series of sequential sub-frames. The applied filter weight is based on (i) an output of the radio link control unit for a previous sub-frame, and (ii) an output of the adaptive filter for the previous sub-frame.

In an embodiment, a method of adjusting a bandwidth report of an evolved Node B is provided. The method includes steps of receiving a buffer status report and a plurality of data packets from a user equipment, determining, by a scheduler of the evolved Node B, that all bytes requested in the buffer status report cannot be granted, providing a partial grant to the user equipment, segmenting a first packet of the received data packets into at least two sub-frames for transport, and buffering a partial segment of the first packet until all of the first packet is received in full by a second grant. The partial segment is not included in the partial grant, but is included in the second grant. The method further includes steps of adjusting the bandwidth report of a second packet to account for partial segment from the first packet, and adding additional bytes to the bandwidth report of the second packet.

BRIEF DESCRIPTION OF THE INVENTION

These and other features, aspects, and advantages of the present disclosure will become better understood when the following detailed description is read with reference to the accompanying drawings in which like characters represent like parts throughout the drawings, wherein:

FIGS. 2A-2C are simplified block diagrams illustrating various arrangements of a Small Cell-BackHaul ("SC-BH") system including a standalone small cell for connecting user equipment ("UE") to a mobile core in accordance with embodiments described herein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
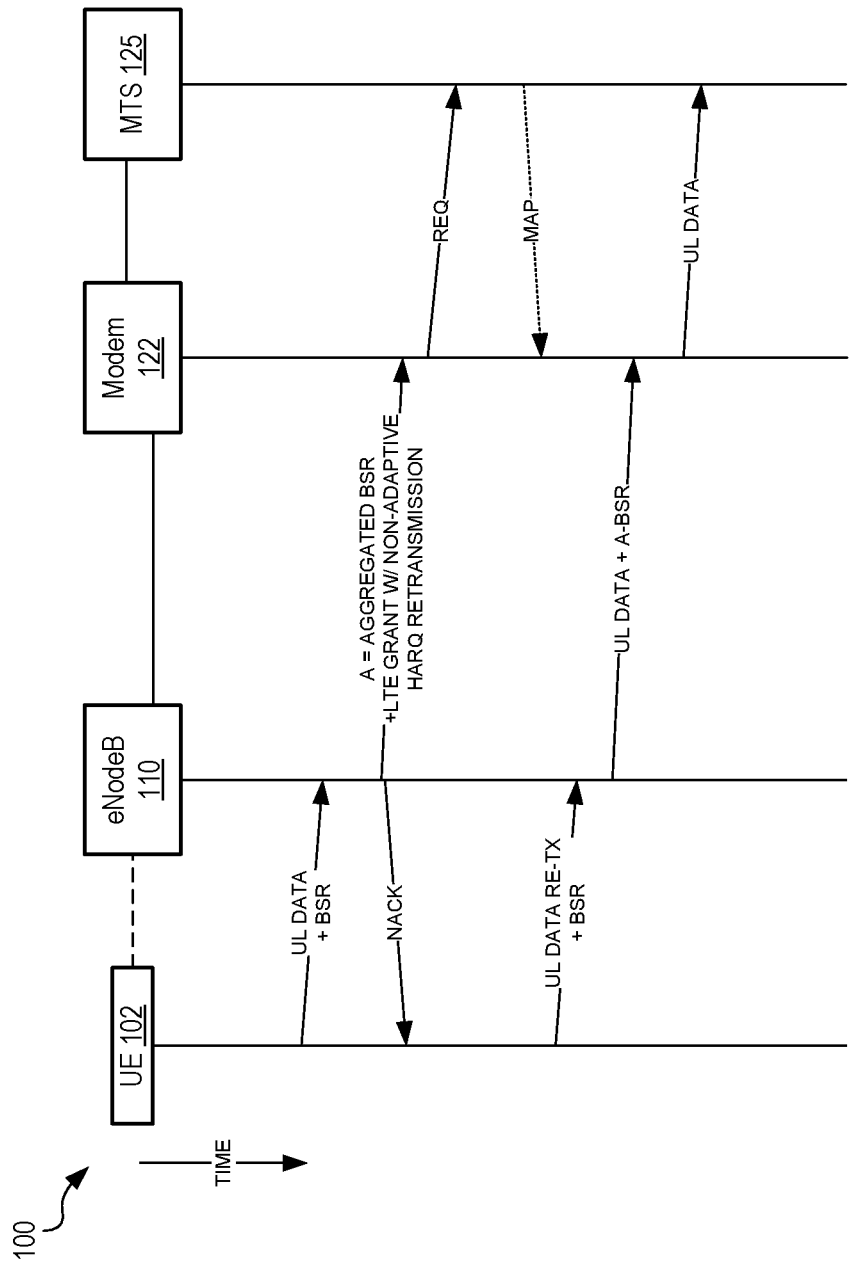
FIG. 1 shows one exemplary Hybrid Automatic Repeat Request (HARD) retransmission process in an LTE-Backhaul environment, in an embodiment.

FIG. 1 shows one exemplary Hybrid Automatic Repeat Request (HARQ) retransmission process in an LTE-Backhaul environment 100. Environment 100 employs an eNodeB 110 (also called herein an eNB) located between and in communication with a User Equipment 102 UE and a modem 122. Modem 122 is also in communication with a modem termination unit (MTS) 125.

In the present embodiment UE 102 transmits Uplink (UL) data plus a Buffer Status Report (BSR) to eNodeB 110. Upon receipt of the Uplink (UL) data plus a Buffer Status Report (BSR) eNodeB 110 determines the data must be retransmitted. Based on the retransmit determination eNodeB 110 performs two actions, one upstream and the other downstream. The upstream action is to aggregate all received BSRs and LTE Grants and transmits this data to modem 122 to prepare the back haul system for the receipt of a retransmitted data package. The back haul system here is shown including modem 122 and MTS 125. eNodeB 110's downstream action is to send a NACK to UE 102, which at least in part instructs UE 102 to retransmit the previously sent UL data and BSR.

At modem 122, upon receipt of the aggregated BSRs and LTE Grants, modem 122 sends a request (REQ) to MTS 125 to request backhaul resources for the transmission of the forth coming retransmitted data plus BSR, shown as "UL data re-tx+BSR". In response to the REQ, MTS 125 sends a MAP or similar protocol dependent resource allocation to modem 122, which allocates the modem requested backhaul resources.

It will be understood that the UL HARQ retransmission may be non-adaptive or adaptive. A non-adaptive HARQ retransmission process sets the retransmission at a predetermined time, for example at subframe 12 (SF12), see for example FIGS. 3 and 5. In a non-adaptive HARQ retransmission process PHY attributes remain the same and are not identified or signaled via a Downlink Control Information (DCI).

Adaptive HARQ retransmission may be signaled or identified by means of a new DCI, as known in the art. It will also be understood that, in an Adaptive HARQ retransmission process, Physical Layer (PHY) attributes may be changed between retransmissions.

If eNB 110 sends a Not Acknowledge (NACK), the eNB 110 may need to account for the additional non-adaptive HARQ retransmission in an LTE grant summary, which eNB 110 sends to modem 122.

FIG. 2A illustrates a simplified block diagram of one embodiment of a small cell-backhaul (SC-BH) system communications environment 200A in which a communication network, such as but not limited to a DOCSIS network, is used to provide a backhaul for small cell data, such as but not limited to an LTE eNB, 4G, 5G, WiMAX, Wi-Fi, etc. data. The communication environment 200A supports connection of at least one UE (not shown, but similar to that shown in communication system 100), via a radio frequency ("RF") interface to a standalone small cell (SC) 204A. Small cells are available for a wide range of air interfaces including GSM, CDMA2000, TD-SCDMA, W-CDMA, LTE and WiMAX. In 3GPP terminology, a Home Node B (HNB) is a 3G femtocell. A Home eNodeB (HeNB) is an LTE femtocell. Wi-Fi is a small cell but does not operate in licensed spectrum. As used herein, UE can be associated with clients, customers, or end users wishing to initiate a communication in a communication system via some network. The term "user equipment" is inclusive of devices used to initiate a communication, such as a computer, a personal digital assistant (PDA), a laptop or electronic notebook, a cellular telephone, an smartphone, an IP phone, or any other device, component, element, or object capable of initiating voice, audio, video, media, or data exchanges within a communication system. UE may also be inclusive of a suitable interface to the human user, such as a microphone, a display, or a keyboard or other terminal equipment. UE may also be any device that seeks to initiate a communication on behalf of another entity or element, such as a program, a database, or any other component, device, element, or object capable of initiating an exchange within a communication system. The detail and best practice associated with the deployment of small cells varies according to use case and radio technology employed Data, as used herein in this document, refers to any type of numeric, voice, video, media, or script data, or any type of source or object code, or any other suitable information in any appropriate format that may be communicated from one point to another. On power up, UE can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

Referring again to FIG. 2A, the SC 204A is connected to a modem 206A. The modem 206A may be connected to one or multiple SC 204A. The modem 206A is connected to a modem termination system ("MTS") 208A via a communication link, such as but not limited to a hybrid fiber coax ("RFC"), for example. In the embodiment illustrated in FIG. 2A, the MTS 208A is implemented as an integrated MTS ("I-MTS"). The MTS 208A connects SC 204A/modem 206A to a wireless core, which in the illustrated embodiment comprises a mobile core 210A. It will be recognized that wireless core may also comprise a Wi-Fi core, LTE packet core, a 5G core, WiMAX core or any other wireless network core. It will be understood that modem 206A may be collocated with SC 204A or may be located separate and independent from SC 204A. Additionally, a collocated combination of SC 204A/modem 206A may be referred to herein as a SC-BH network element.

FIG. 2B illustrates a simplified block diagram of another embodiment of a SC-BH system communications environment 200B in which a communication network, such as but not limited to a DOCSIS network, is used to provide a backhaul for SC 204B, an example of which is an LTE eNB. Similar to the communications environment 200A, the communications environment 200B supports connection of at least one UE via an RF interface to a standalone SC 204B. One or multiple SC 204B may be connected to a modem 206B. In the embodiment shown in FIG. 2B, MTS functionality is split between a MTS core 208B and a Remote PHY Device (RPD) 209B. The RPD 209B/MTS core 208B connects the SC 204B and modem 206B to a mobile core 210B, which may be implemented as an LTE packet core. It will be understood that modem 206B may be collocated with SC 204B or may be located separate and independent from the SC. Additionally, a collocated combination of the SC 204B/modem 206B may be referred to herein as a SC-BH network element.

FIG. 2C illustrates a simplified block diagram of yet another embodiment of a SC-BH system communications environment 200C in which a communication network, such as but not limited to a DOCSIS network, is used to provide a backhaul for an LTE eNB. Similar to the communications environment 200A, the communications environment 200C supports connection of at least one UE via an RF interface to a standalone SC 204C. One or multiple SC 204C is connected to a modem 206C. In the embodiment shown in FIG. 2C, MTS functionality is split between a remote MAC/PHY 207C and a router 209C. The remote MAC/PHY 207C/router 209C connects the SC 204C/modem 206C to a mobile core 210C, which may be implemented as an LTE packet core. It will be understood that modem 206C may be collocated with SC 204C or may be located separate and independent from the SC. Additionally, a collocated combination of the SC 204C/modem 206C may be referred to herein as a SC-BH network element.

Figure 2D:
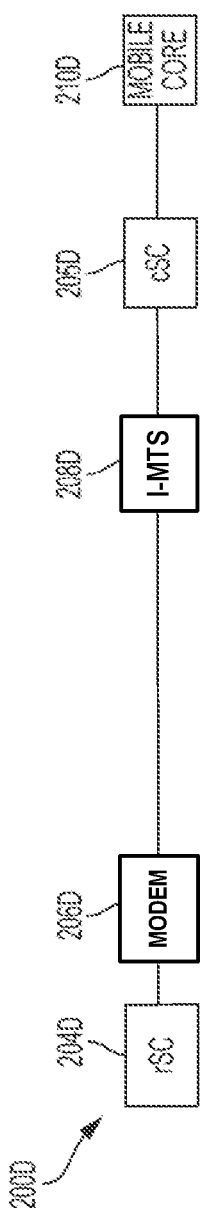
FIGS. 2D-2F are simplified block diagrams illustrating various arrangements of a SC-BH system including a split small cell for connecting UE to a mobile core in accordance with embodiments described herein.

FIG. 2D illustrates a simplified block diagram of one embodiment of a SC-BH system communications environment 200D in which a communication network, such as but not limited to a DOCSIS network, is used to provide a backhaul for an LTE eNB. The communications environment 200D supports connection of at least one UE via an RF interface to a remote Small Cell (rSC) 204D portion of a split small cell, which also includes a centralized Small Cell (cSC) portion 205D. One or more rSC 204D is connected to a modem 206D (also sometimes called just "modem" herein. The modem 206D is connected to a modem termination system ("MTS") 208D via hybrid fiber coax ("RFC"), for example. In the embodiment illustrated in FIG. 2D, the MTS 208D is implemented as an I-MTS. The MTS 208D/cSC 205D connects the rSC 204D/modem 206D to a mobile core 210D, which may be implemented as an LTE packet core. It will be understood that modem 206D may be collocated with rSC 204D or may be located separate and independent from the rSC. Additionally, a collocated combination of the rSC 204D/modem 206D may be referred to herein as a SC-BH network element. In certain embodiments, I-MTS, cSC, and/or mobile core may also be collocated.

Figure 2E:
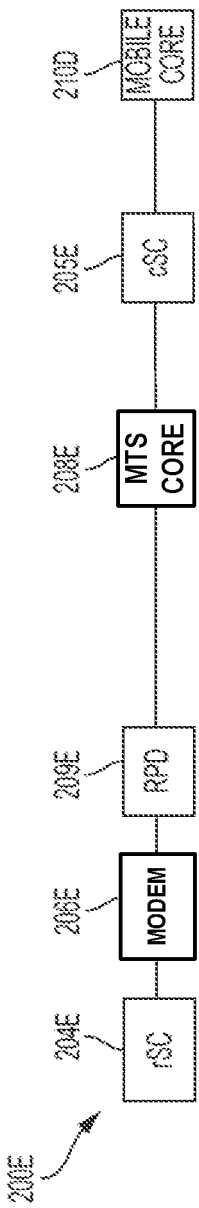

FIG. 2E illustrates a simplified block diagram of another embodiment of a SC-BH system communications environment 200E in which a communication network, such as but not limited to a DOCSIS network, is used to provide a backhaul for an LTE eNB. Similar to the communications environment 200A, the communications environment 200E supports connection of at least one UE via an RF interface to an rSC 204E portion of a split SC, which also includes a cSC portion 205E. One or more rSC 204E is connected to a modem 206E. In the embodiment shown in FIG. 2E, MTS functionality is split between a MTS core 208E and an RPD 209E. The RPD 209E/MTS core 208E/cSC 205E connects the rSC 204E/modem 206E to a mobile core 210E, which may be implemented as an LTE packet core. It will be understood that modem 206E may be collocated with rSC 204E or may be disposed in a location separate and independent from the rSC. Additionally, a collocated combination of the rSC 204E/modem 206E may be referred to herein as a SC-BH network element.

Figure 2F:
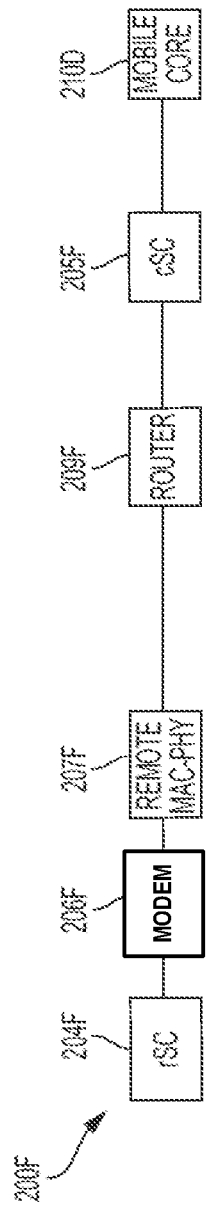

FIG. 2F illustrates a simplified block diagram of yet another embodiment of a SC-BH system communications environment 200F in which a communication network, such as but not limited to a DOCSIS network, is used to provide a backhaul for an LTE eNB. Similar to the communications environment 200A, the communications environment 200F supports connection of at least one UE via an RF interface to an rSC 204F portion of a split SC, which also includes a cSC portion 205F. One or more rSC 204F is connected to a modem 206F. In the embodiment shown in FIG. 2F, MTS functionality is split between a remote MAC/PHY 207F and a router 209F. The remote MAC/PHY 207F/router 209F/cSC 205F connects the rSC 204F/modem 206C to a mobile core 210F, which may be implemented as an LTE packet core. It will be understood that modem 206F may be collocated with rSC 204F or may be disposed in a location separate and independent from the rSC. Additionally, a collocated combination of the rSC 204F/modem 206F may be referred to herein as a SC-BH network element.

It will be noted that FIGS. 2A-2C illustrate embodiments comprising a standalone SC, while FIG. 2D-2F illustrate embodiments comprising a split SC. It will be recognized that techniques described herein are equally applicable to any of the embodiments shown in FIGS. 2A-2F. It will be further recognized that the embodiments illustrated in FIGS. 2A-2F are provided for purposes of example only and are not meant to be an exhaustive list of embodiments in which the techniques described herein may be advantageously implemented. Moreover, although not illustrated in FIGS. 2A-2F, a network interface device ("NID") may optionally be provided between the SC/rSC and modem.

Figure 3:
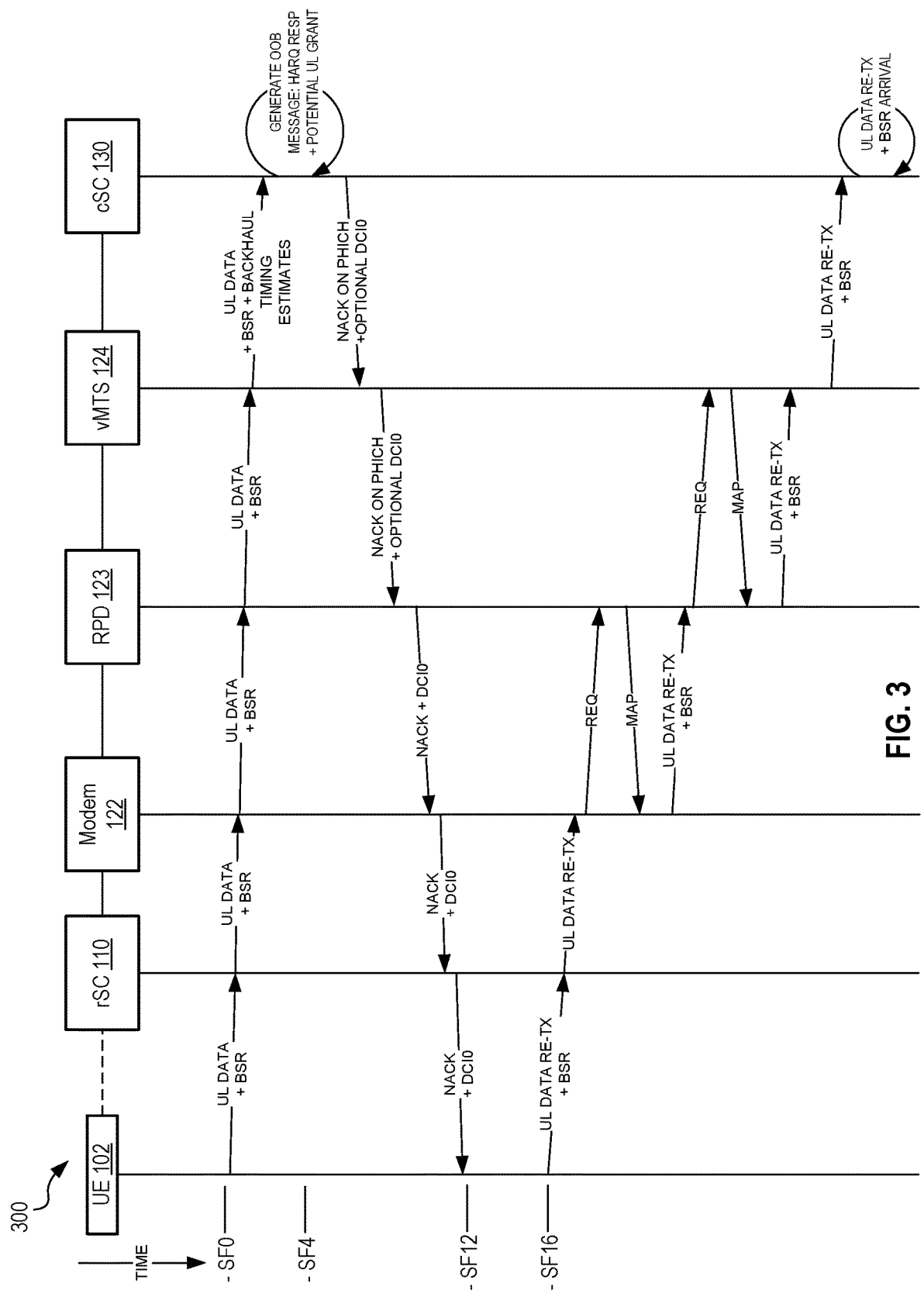
FIG. 3 shows one exemplary simplified block diagram and timing diagram for a Small Cell-BackHaul (SC-BH) communication system, in an embodiment.

FIG. 3 shows one exemplary timing diagram for a SC-BH communication system 300.

Communication system 300 includes a UE 102 in wireless communication with an rSC 110. rSC 110 communicates in a wired or wireless manner with cSC 130 via a backhaul network, which includes a modem 122, a RPD 123, and a vMTS 124.

UE 102 is the same or similar to UE 102 of FIG. 1 and UEs described but not shown in FIGS. 2A-F. rSC 110 is the same or similar to rSCs 204D-F of FIGS. 2D-F. Modem 122 is the same or similar to modem 122 of FIG. 1 and modem 206A-F of FIGS. 2A-F. RPD 123 is the same or similar to RPD 209B, 209E and remote MAC-PHY 207C, 207F, depending on the implementation and embodiment. vMTS 124 is the same or similar to MTS 125 of FIG. 1, MTS 208A of FIG. 2A, MTS core 208B, 208E of FIGS. 2B and 2E respectively, router 209C, 209F or FIGS. 2C and 2F respectively, and I-MTS 208D of FIG. 2D, depending on the implementation and embodiment. cSC 130 is the same or similar to aspects of mobile core 210A-C of FIGS. 2A-C respectively, and cSC 205D-F or FIGS. 2D-F respectively.

As discussed above, LTE UL HARQ may be either adaptive or non-adaptive. In an adaptive embodiment PHY attributes may be changed between each transmission and retransmissions and between each retransmission. PHY attributes that may change include but are not limited to MCS order and redundancy version. In a non-adaptive embodiment the system may maintain PHY attributes between transmission and retransmission, and between retransmissions.

Figure 4:
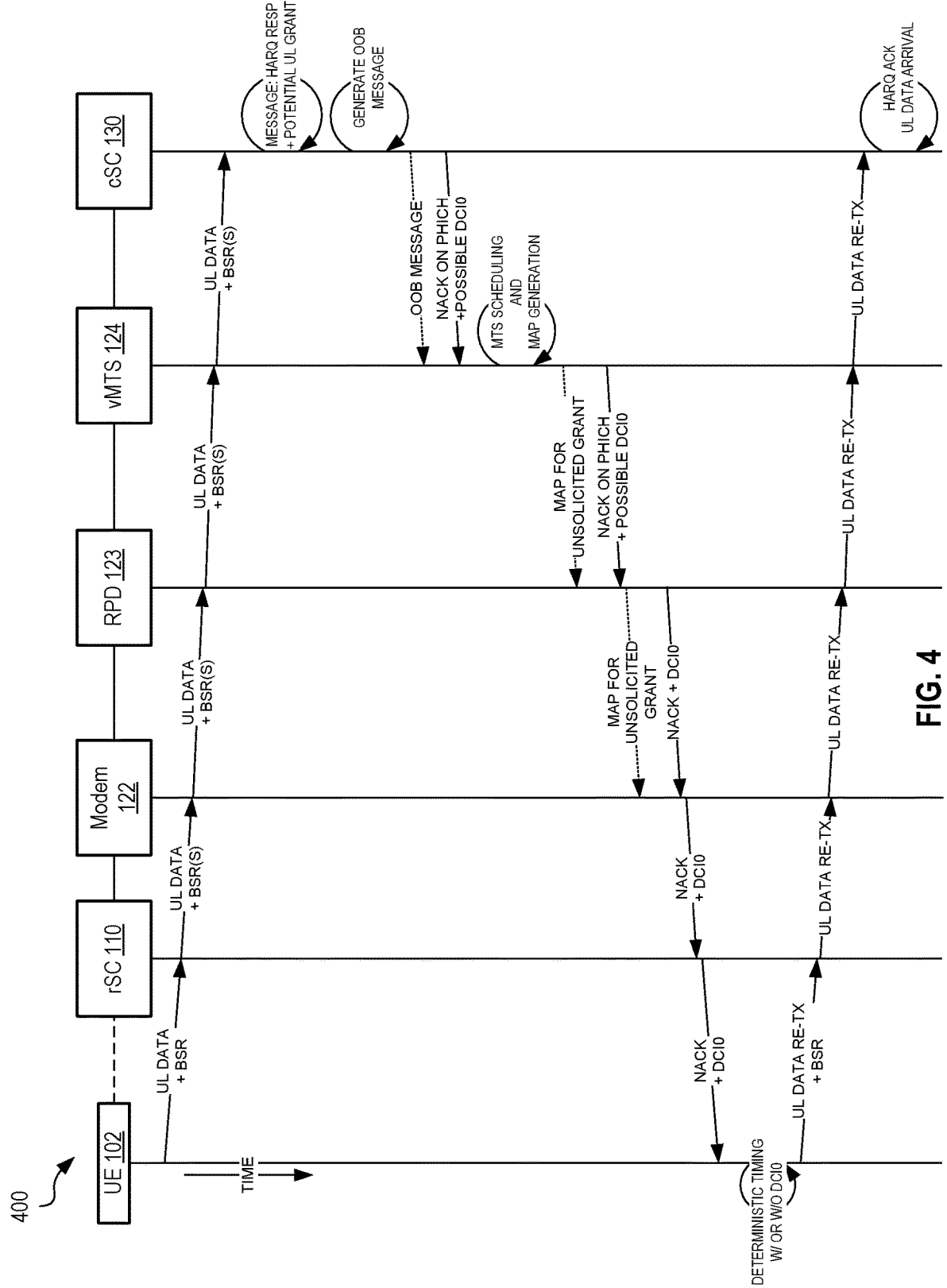
FIG. 4 shows one exemplary simplified block diagram and timing diagram for a Small Cell-BackHaul (SC-BH) communication system, in an embodiment.
Figure 5:
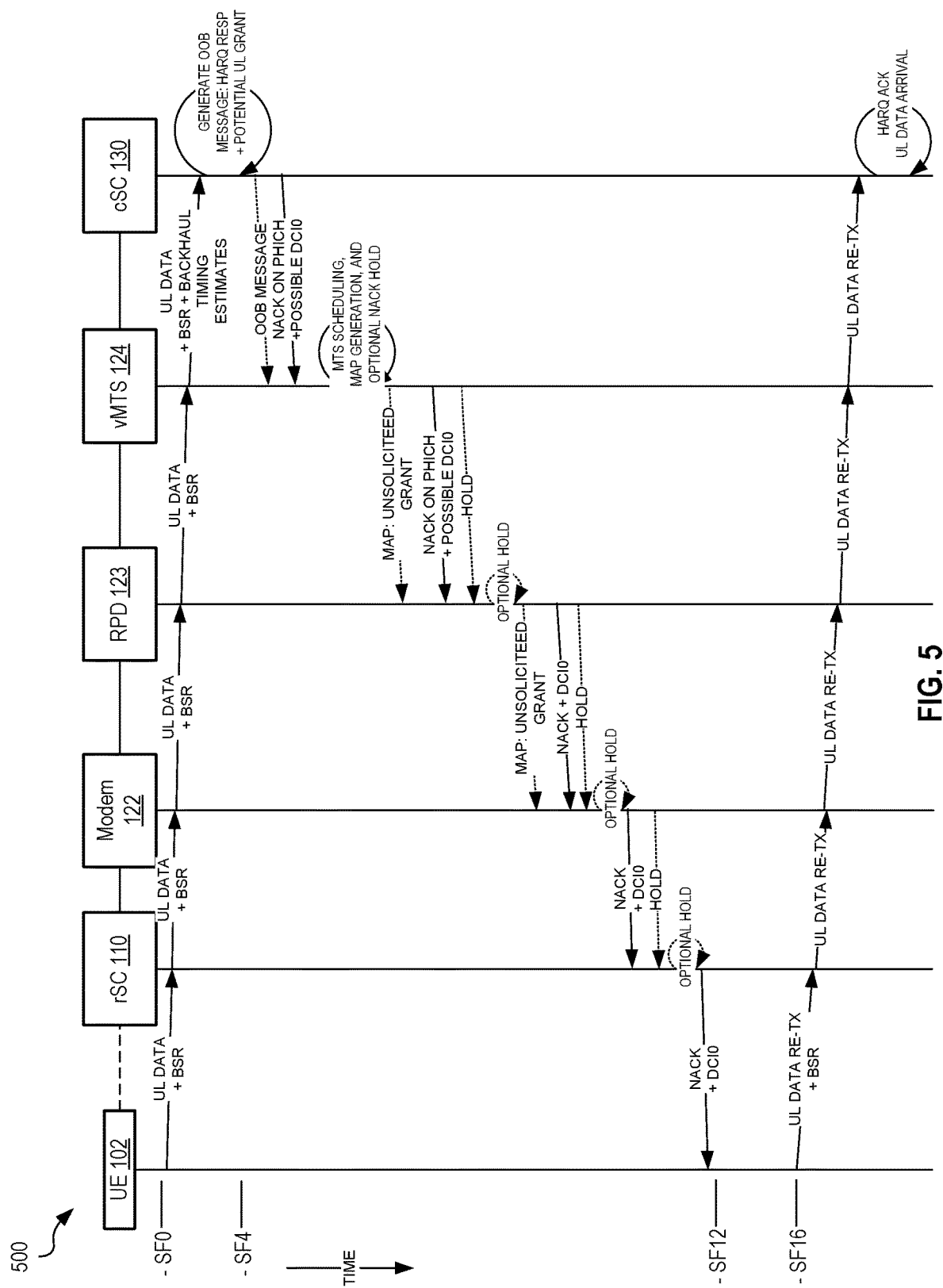
FIG. 5 shows one exemplary simplified block diagram and timing diagram for a Small Cell-BackHaul (SC-BH) communication system, in an embodiment.

In communication system 300, UE 102 transmits UL data plus a buffer status report (BSR) to cSC 130 via rSC 110, modem 122, RPD 123, and vMTS 124. vMTS may optionally add a backhaul timing estimate to the UL data plus BSR for processing at the cSC 130 (or an associated mobile core, not shown). If cSC 130 cannot read all or a portion of the UE 102's UL data then cSC 130 will transmit a NACK back UE 102. In an LTE embodiment, when the cSC 130's MAC layer determines a NACK is required, cSC 130 sends the NACK on the PHICH control channel with the optional DCI0. In FIGS. 3-5, "NACK on PHICH+optional DCI0" and "NACK+DCI0" are used interchangeably.

As discussed above, cSC 130 may optionally include a DCI0 for a quick scheduling assignment, shown as both "optional DCI0" and just "DCI0" in the figures. The remainder of this discussion will center on the transmission of the NACK without the DCI0. Once a NACK is received at UE 102, the UE re-transmits the UL data plus BSR as UL data retransmission (re-tx) plus BSR after 4 subframes of receiving the NACK. For example, the NACK is received at sub-frame (SF) 12 and the retransmission of UL data retransmission (re-tx) plus BSR occurs at SF16 from UE 102 to rSC 110. UL data re-tx plus BSR is then received at rSC 110 and forward to modem 122. Modem 122 then sends a REQ to RPD 123, which replies with a MAP which provides resources to modem 122 to transmit the UL data retransmission (re-tx) plus BSR. Modem 122 then transmits UL data re-tx plus BSR to vMTS 124. Upon receipt of the UL data re-tx plus BSR, RPD 123 then sends a REQ to vMTS 124, which replies with a MAP, which provides resources to RPD 123 to transmit the UL data re-tx plus BSR to vMTS 124. vMTS 124 then sends the UL data re-tx plus BSR to cSC 130 for processing.

FIG. 4 shows one exemplary timing diagram for a SC-BH communication system 400.

In the embodiment of FIG. 4, cSC 130 sends an Out Of Band (OOB) message informing vMTS 124 that a NACK is sent from cSC 130 to UE 102. As discussed further below, vMTS 124 may use this information to generate one or more unsolicited grants on the backhaul side (i.e., for one or more of RPD 123, modem 122, or other real elements or virtualized functions not show) for pipelining purposes.

Communication system 400 includes the same or similar UE 102, rSC 110, cSC 130, modem 122, RPD 123, and vMTS 124 as described and disclosed in FIG. 3, above.

For sake of simplicity, the optional backhaul timing estimate is not shown in system 400. Communication system 400 differs from system 300 in that cSC 130 generates the above referenced Out Of Band (OOB) message. This OOB message is sent to vMTS 124 to instruct vMTS 124 that a NACK is being or has been transmitted from cSC 130 to UE 102. cSC 130 may also send an optionally new grant summary, which includes all new transmission plus retransmissions. vMTS 124 may use this information to generate one or more unsolicited backhaul grants (shown in FIG. 4 as "MAP generation") for pipelining UE 102 data. Pipelining here means preparing and transmitting grants such that they are in place at one or more backhaul elements, (e.g., modem 122, RPD 123, and vMTS 124) prior to the arrival of UL data from UE 102 at the one or more backhaul element such that the UL data may be transmitted through the backhaul system with minimal or no delay. In a DOCSIS communication system these backhaul grants are provided by a MAP sent from a version of a Cable Modem Termination System or CMTS, as known in the art.

A solicited grant is a grant that is requested by a transmitting device, such as UE 102. One example of a solicited grant can be seen in FIG. 3 after SP 16. Modem 122 transmits a REQ and in response receives a MAP for the purpose of transmitting UL data re-tx plus BSR. RPD 123 also transmits a REQ and in response receives a MAP for the purpose of transmitting UL data re-tx plus BSR. These are both types of solicited grants as known in the art.

An unsolicited grant is a grant that is not requested by a transmitting device, such as UE 102. By preparing and having in place an unsolicited grant the multiple REQ-MAP-Transmit process described above for the solicited grant can be eliminated. Eliminating the solicited grant can save valuable time and reduce latency.

Since UE 102 has 8 UL HARQ processes, and they are synchronized, UE will look for N/ACK again in 8 sub-frames. For example, if a first transmission is sent at SF0 and no ACK was received by SF4, then UE 102 will wait for 8 subframes, i.e., UE 102 will wait until SF12 before doing anything else. eNB is responsible for sending correct HARQ response with correct timing, in time for UE to receive it at the next interval.

It will be understood that the transmit, receipt, and processing of the OOB message at cSC 130 and vMTS 124 is only one possible process for vMTS 124 to receive information for the generation of an unsolicited grant. In an alternative embodiment (not shown), cSC 130 does not transmit an OOB message. Instead, vMTS 124 directly or indirectly reads the NACK on PHICH plus possible DCI0 message sent from cSC 130. Directly or indirectly reading may be reading all or only a portion(s) of the message. Indirectly reading this message may be, for example, generating a copy of the message reading all or a portion(s) of the message. Reading the message, directly or indirectly, may cause vMTS 124 to generate the MAP, in the same or a similar manner as described above.

FIG. 5 shows one exemplary timing diagram for a SC-BH communication system 500. System 500 is similar to system 400 of FIG. 4 with the addition of optional holds included, which ensure the cSC 130 transmitted is received at US 102 at SF12, discussed further below.

For sake of simplicity "HARQ response plus potential UL grant" and "generate OOB message" of FIG. 4 are combine into a single "Generate OOB message: HARQ response plus potential UL grant." Furthermore, "UL data plus BSR" of FIG. 4 is changed to "UL data plus BSR plus backhaul timing estimates" in FIG. 5 to represent the option of adding backhaul timing estimates at vMTS 124 prior to transmission to cSC 130. Backhaul timing estimates will be discussed further below.

In the embodiment of FIG. 5, cSC 130 sends an Out Of Band (OOB) message informing vMTS 124 that a NACK is sent from cSC 130 to UE 102. As discussed further below, vMTS 124 may use this information to generate one or more unsolicited grants on the backhaul side (i.e., for one or more of RPD 123, modem 122, or other real elements or virtualized functions not show) for pipelining purposes. As discussed above, vMTS 124 may employ alternative process and/or devices to obtain data to generate an unsolicited grant, e.g., directly or indirectly reading the NACK on PHICH plus possible DCI0 message.

Starting where system 500 diverges from system 400, vMTS 124 adds an optional backhaul timing estimate data to the UL data plus BSR for transmission to cSC 130. vMTS 124 then transmits UL data plus BSR plus backhaul timing estimate to cSC 130. Utilizing one or both of the optional backhaul timing estimate data and the UL data plus BSR for transmission cSC 130 generates the OOB message and HARQ response plus potential UL grant. The OBB message and the NACK are sent, either together or separately, to vMTS 124. vMTS 124 reads the OBB message and generates an MAP detailing one or more unsolicited grants and prepares a vMTS 124 schedule for the backhaul system. In addition, and important to the embodiment of system 500, vMTS 500 determines if a hold is required to ensure that NACK arrives at UE 102 at SF12. If vMTS 124 determines that a hold will benefit the communication process, then vMTS 124 determines the length of the hold and where the hold will occur. In various embodiments, the length of the hold may be determined forward from the original transmission at SF0 or backwards from when the NACK needs to arrive at, e.g., at SF12. The hold may occur at any one of the backhaul elements that are shown, such as modem 102, RPD 123, and MTS 124, or those that are not shown, non-limiting examples of which can be seen in FIGS. 2A-F. In another embodiment a NACK hold may occur at rSC 110 or some other small cell element or virtualized function.

In all other ways system 500 is similar or the same as system 400.

In a separate embodiment, the NACK hold is a small cell NACK hold, which is controlled on the small cell side, for example by one or more of the rSC 102, cSC 130, and the mobile core (not shown). In one example, cSC 130 receives and analyzes (or forwards to another cooperating element for analysis) the backhaul timing estimates provided by vMTS 124 to determine the backhaul transmit times for the purpose of ensuring a cSC 130 transmitted NACK arrives at UE 102 at SF12. This analysis may also take into consideration the transmit time between cSC 130 and vMTS 124.

Packet Segmentation in Standalone Small Cell

In another embodiment, systems and methods for packet segmentation in a bandwidth report (BWR) of the standalone small cell may be calculated by a remote radio head. In an exemplary embodiment, the remote radio head is an eNodeB. In other embodiments, the radio head is a communication controller capable of coordinating scheduling with a backhaul system, such as, but not limited to a DOCSIS backhaul system.

Figure 6:
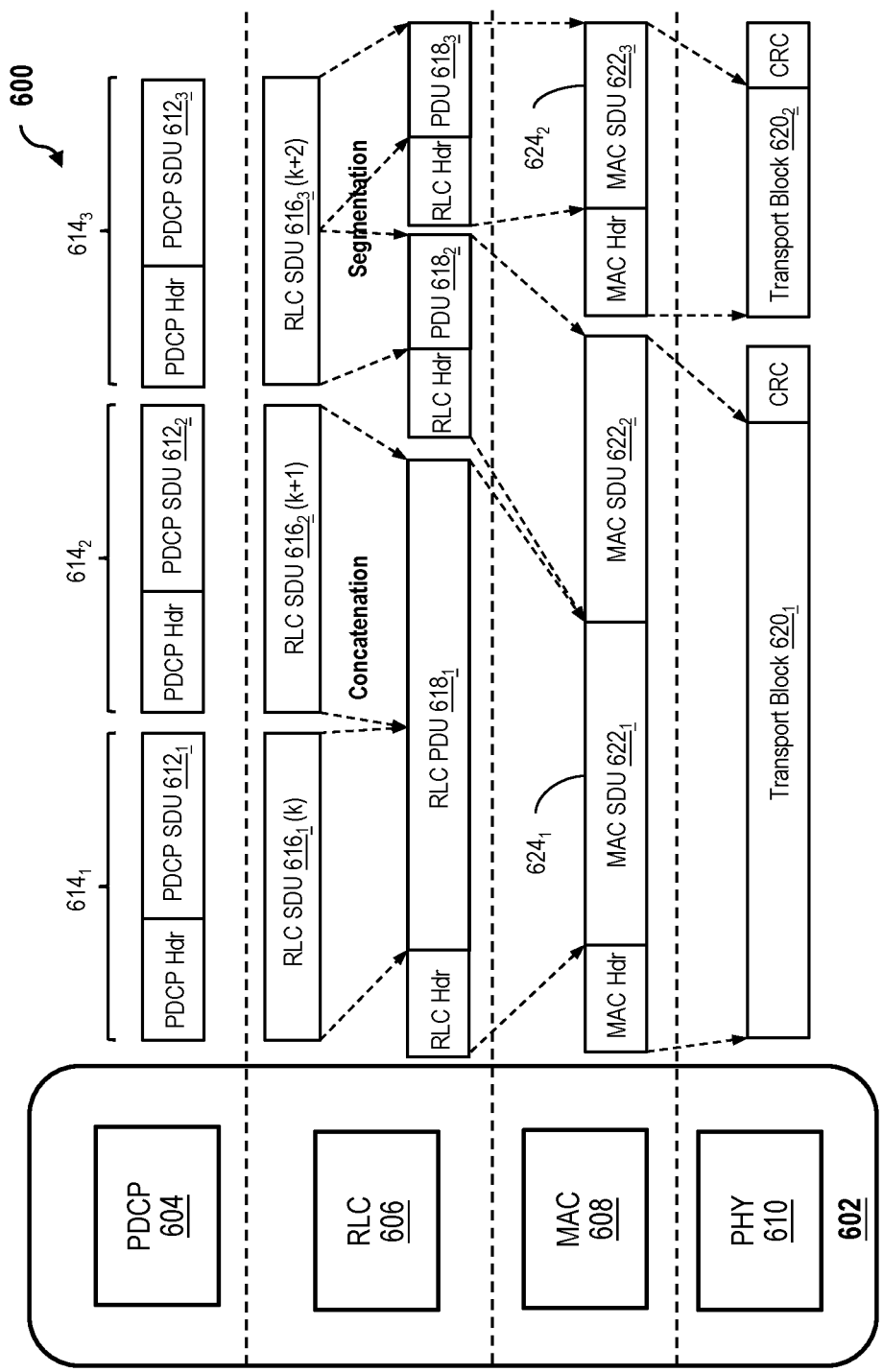
FIG. 6 illustrates a packet segmentation effect for an architecture in the Uplink (UL) data plane, in an embodiment.

FIG. 6 illustrates a packet segmentation effect 600 for an architecture 602 in the Uplink (UL) data plane (see e.g., FIGS. 1-3, above) of the standalone small cell. In an embodiment, architecture 602 represents a user plane architecture. Architecture 602 includes a packet data convergence protocol (PDCP) layer 604, a radio link control (RLC) layer 606, a media access control (MAC) layer 608, and a physical layer (PHY) 610. In an exemplary embodiment, architecture 602 represents a user plane architecture of an eNB.

In operation, at the user plane side of the UL data plane, IP data packets 612 are received by architecture 602, and typically at PDCP layer 604. A packet that is received by a particular layer of architecture 602 is referred to as a Service Data Unit (SDU), and a packet that is output from a layer is referred to as a Protocol Data Unit (PDU). In an exemplary embodiment, IP data packets 612 are processed in the user data plane by particular protocols (e.g., TCP, UDP, IP, etc.), and in the control plane (not shown in FIG. 6), a protocol of the radio resource control (RRC) layer (also not shown in FIG. 6) writes signaling messages that are exchanged between the base station and the mobile. In the exemplary embodiment, the received information is processed by the respective protocols of PDCP layer 604, RLC layer 606, and MAC layer 608 before being passed to PHY layer 610 for transmission.

In operation of architecture 602, the eNB scheduler will grant all bytes requested by a UE in the BSR. In such instances, the Bandwidth Report (BWR) generated by eNB will match the exact amount of LTE data that the modem/MTS should expect. In the example illustrated in FIG. 6, PDCP SDU packets $612_1$ and $612_2$ are output from PDCP layer 604 as PDCP PDUs $614_1$ and $614_2$, respectively, and then received by RLC layer 606 as RLC SDUs $616_1$ (k) and $616_2$ (k+1), respectively. RLC layer 606 concatenates RLC SDUs $616_1$ and $616_2$ into RLC PDU $618_1$. In this example, PDCP PDUs $614_1$ and $614_2$ are from the same data radio bearer (DRB), and PDCP PDU $614_3$ is from a different DRB.

In some instances, the eNB scheduler cannot grant all bytes that have been requested in the BSR, and therefore provide only a partial grant. Since the BSR does not report packet boundaries, a partial grant may result in a segmented packet, a portion of which may be sent according to a separate grant. Therefore, since the BWR describes the amount of data that should be expected to egress from the eNB and arrive at the modem at a precise time, a partial grant may result in a mismatch between the LTE data actually egressed and the amount of data that is expected according to a prediction by the BWR. In the example illustrated, RLC SDU $616_3$ is shown to be segmented at RLC layer 606 into two separate RLC PDUs $618_2$ and $618_3$. That is, the partial grant causes the packet segmentation in RLC layer 606.

In further operation, after receiving a grant (in bytes), the UE will fill a transport block (TB) 620 with RLC PDUs 618. However, since the size of RLC PDU 618 is based on the size of TB 620, segmentation in RLC layer 606 can affect TB 620. For example, if an RLC SDU is large, or the available radio data resource is low (i.e., thereby resulting in smaller sizes of TB 620), the RLC SDU may be split, i.e., segmented, among several RLC PDUs. This is segmentation effect is illustrated with respect to RLC SDU $616_3$, which is split among separate RLC PDUs $618_2$ and $618_3$. Similarly, if an RLC SDU is small (or the available radio data resource is high), several RLC SDUs may be packed, i.e., concatenated, into a single PDU. This concatenation effect is illustrated with respect to RLC SDUs $616_1$ and $616_2$, which are concatenated into single RLC PDU $618_1$. Similarly, separate RLC PDUs 618 (e.g., RLC PDU $618_1$ and RLC PDU $618_2$) may be concatenated at MAC layer 608. That is, the respective MAC SDUs (e.g. MAC SDU $622_1$ and MAC SDU $622_2$) may be packed into a single MAC PDU 624 (e.g., MAC PDU $624_1$). An output (not illustrated in FIG. 6) of PHY layer 610 arranges transport blocks 620 into individual sub-frames/sub-frame slots.

According to the embodiments illustrated in FIG. 6, systems and methods implementing packet segmentation effect 600 are capable of realizing greater versatility in the uplink transmission in comparison with conventional systems. According to these exemplary embodiments, an IP packet may be segmented or transported in more than one sub-frame. In further operation of packet segmentation effect 600, the eNB will buffer the partial segments of PDCP/IP packets until the packets are received in full. The complete PDCP/IP packets are then sent to an egress queue (not shown), which is then sent to the CM. In at least some embodiments, the UE fills grant requests having the highest priority logical channel (LC) first, with one-to-one mapping from the DRB to the LC. In the examples described above, there is presumed to be one RLC entity (e.g. RLC layer 606) per LC, where each RLC entity creates RLC PDUs 618, and LC-logical channel group (LCG) is performed at setup of the respective DRB.

Figure 7:
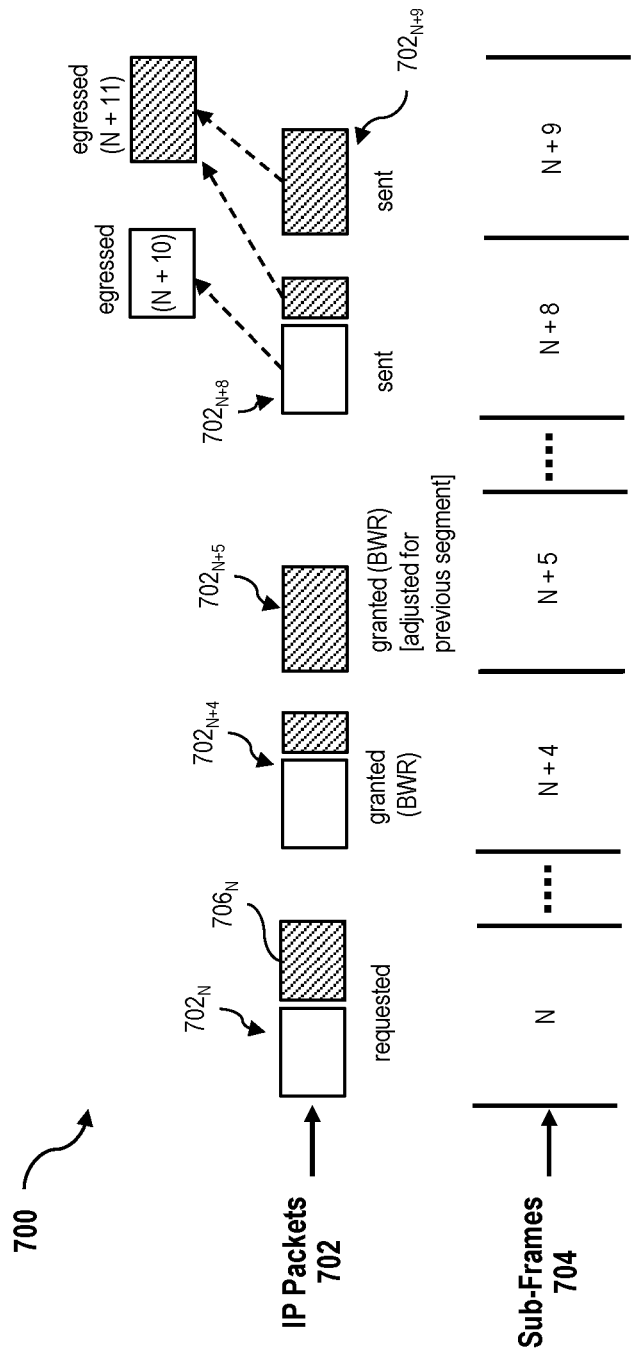
FIG. 7 illustrates a bandwidth report adjustment effect that may be utilized with the packet segmentation effect depicted in FIG. 6.

FIG. 7 illustrates a bandwidth report (BWR) adjustment effect 700 that may be utilized with packet segmentation effect 600, FIG. 6. For example, BWR adjustment effect 700 may be implemented for IP packets 702 with respect to an N series of sub-frames 704. As illustrated in FIG. 7, when an IP packet 702 is fragmented (e.g., IP packet $702_N$), in an exemplary embodiment, the eNB may buffer the partial packet until a remaining packet segment 706 is sent in a future grant. In this embodiment, the BWR may be insufficient to account for the previous segment, as illustrated with respect to IP packet $702_{N+5}$. In such instances, BWR adjustment effect 700 adjusts the BWR of IP packet $702_{N+5}$ to account for the previous segment (e.g., from IP packet $702_{N+4}$). That is, there should be a sufficient DOCSIS grant (i.e., in the case of a DOCSIS backhaul system) to account for the previous segment so that the entire IP packet may be sent when the IP packet egresses from the eNB.

In an exemplary embodiment, BWR adjustment effect 700 causes the eNB to add additional bytes to the BWR (e.g., in the respective DOCSIS grant(s)). Alternatively, BWR adjustment effect 700 causes the terminal unit, such as the CMTS, to add additional bytes in the DOCSIS grant(s). In some embodiments, the terminal unit is not a cable-specific CMTS. As illustrated in FIG. 7, a packet segment 706 from one sub-frame 704 (e.g., packet segment $706_{N+8}$ from sub-frame $704_{N+8}$) may be concatenated with an IP packet 702 from a different sub-frame 704 (e.g., IP packet $702_{N+9}$ from sub-frame $704_{N+9}$) to egress with respect to a still further sub-frame 704 (e.g., sub-frame $704_{N+11}$).

In alternative embodiment, the eNB may add up to 1518 bytes to the BWR (e.g., or a maximum packet size) for each active UE, and for each sub-frame 704 or for each BWR reporting period. Alternatively, the terminal unit or CMTS can perform this adjustment. This alternative embodiment may be referred to as a "brute force adjustment." In at least one embodiment, it is presently contemplated that a DOCSIS grant overage may be as much as 12 Mbps per active UE, as an example of a "worst case scenario."

In some cases, when the eNB performs reassembles a fragmented IP packet (e.g., from in the UE), additional latency may be introduced in the eNB. If the accumulated latency is too great, IP packets may be sufficiently delayed such that the packets will not arrive in the modem upstream buffer in time to use the grant that the MTS has sent in accordance with the BWR. Accordingly, the MTS may predict the delay of IP packets at the modem and issue grants at a later time (including buffering time in the modem to absorb the latency from the eNB reassembly operation). Alternatively, the MTS issues particular grants to the modem to achieve minimum latency, but also additional grants to compensate for unused MTS grants. A more accurate BWR adjustment prediction, however, would render both of these alternatives less necessary, while also rendering BWR adjustment effect 700 more effective in the backhaul.

Figure 8:
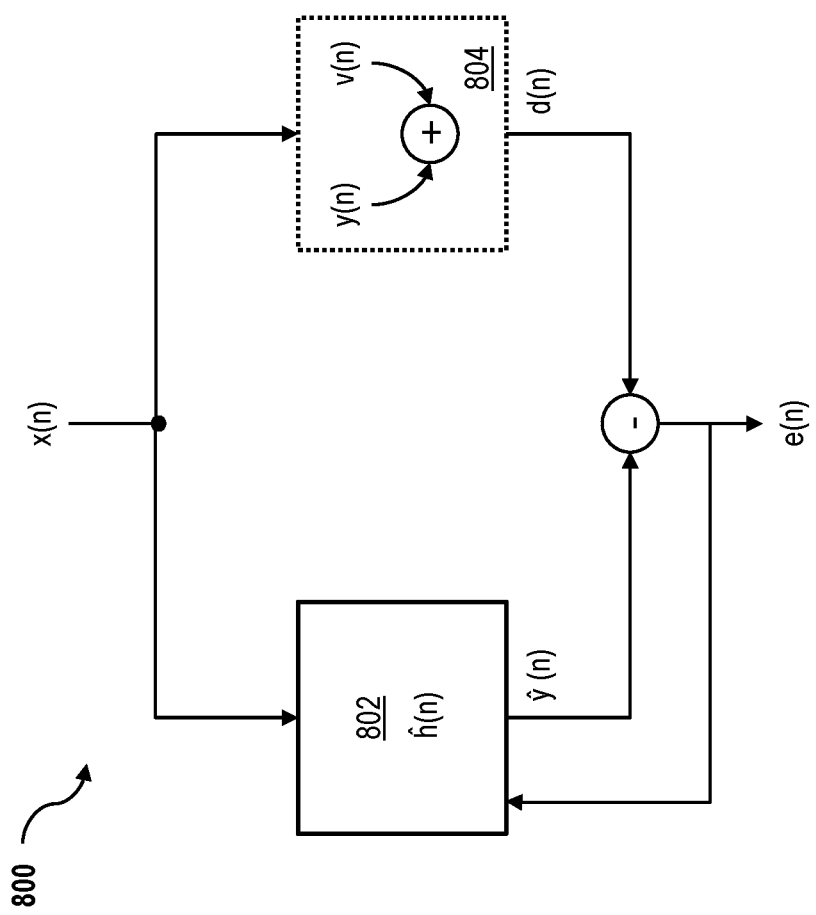
FIG. 8 is a schematic illustration of a correlator that may be utilized with the bandwidth report adjustment effect depicted in FIG. 7.

FIG. 8 is a schematic illustration of a correlator 800 that may be utilized with BWR adjustment effect 700, FIG. 7. In instances of partial grants, the BWR and the egress amount will not be an exact match. Correlator 800 is thus implemented to predict the amount of BWR adjustment needed (e.g., IP packet $702_{N+5}$, FIG. 7), i.e., to account for a previous segment. Correlator 800 implements an adaptive filter 802 together with an eNB RLC 804 to time-correlate the BWR and the egress amount. In the exemplary embodiment, adaptive filter 802 includes at least one filter weight $\hat{h}(n)$. In at least one embodiment, filter weight $\hat{h}(n)$ further utilizes a least mean square (LMS) operation to dynamically and incrementally predict the adjusted amount.

In some embodiments, correlator 800 is a distinct hardware unit implemented in cooperation with architecture 602, FIG. 6, either at the eNB or UE. In other embodiments, correlator 800 is implemented through software programming of a processor of an existing user plane architecture 602. In at least one embodiment, correlator 800 is implemented through a combination of hardware components and software programming.

In operation, correlator 800 time-correlates the BWR and egress amounts for m UEs, and over n sub-frames, for an input x(n), which is represented according to:

$$x(n) = \Sigma_m DC10 \tag{Eq. 1}$$

$$x(n) = [x(n), x(n-1), \ldots, x(n-p+1)]^T \tag{Eq. 2}$$

Additionally, eNB RLC 804 receives input x(n) and outputs an observed sum d(n) for the n sub-frames. Observed sum d(n) represents the combination of an ideal BWR y(n) (i.e., where y(n)=x(n)) and a segmentation-induced noise v(n). Adaptive filter 802 also receives input x(n), but outputs an adjusted BWR $\hat{y}(n)$, which represents the predicted sum of PDCP bytes for the n sub-frames, and which may be sent to the DOCSIS system. In exemplary operation, correlator 800 outputs an error function e(n), which is calculated according to:

$$e(n)=d(n)-\hat{y}(n) \quad \text{(Eq. 3)}$$

In the exemplary embodiment, adaptive filter 802 dynamically adjusts filter weighting from the received error function e(n) for each increment of the n sub-frames to ideally adjust the BWR amount for each previous segment. This dynamic adjustment is represented according to:

$$\min_{\hat{h}} E[|e(n)^2|] \quad \text{(Eq. 4)}$$

Accordingly, the weighting of adaptive filter 802, for each successive increment of the n sub-frames, may then be accomplished according to the equation:

$$\hat{h}(n+1)=\hat{h}(n)+\mu e(n)x(n) \quad \text{(Eq. 5)}$$

Thus, through the advantageous implementation of correlator 800, a more accurate prediction of the BWR adjustment amount (e.g., for BWR adjustment effect 700, FIG. 7) may be achieved, and which also avoids conventional latency difficulties encountered by conventional systems. More particularly, correlator 800 significantly improves upon the ability of the eNB (or remote radio head) to coordinate scheduling with a backhaul, e.g., a DOCSIS backhaul system, and thereby more effectively account for packet segmentation in the BWR calculation thereof.

Exemplary embodiments of systems and methods for addressing packet segmentation are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A radio head for a backhaul system, the radio head in operable communication with at least one separate user equipment device configured to transmit a buffer status report to the radio head, the radio head comprising:
    a standalone small cell configured to (i) receive a plurality of IP packets over a series of sequential sub-frames, at least one IP packet of the plurality of IP packets segmented over at least two sub-frames of the series of sequential sub-frames, and (ii) generate a bandwidth report for each of the plurality of received IP packets;
    a radio link control unit configured to sum a received bandwidth report with a segmentation induced noise value for each of the plurality of received IP packets; and
    an adaptive filter configured to apply a filter weight to and output an adjusted bandwidth report for each of the series of sequential sub-frames, wherein the applied filter weight at a first sub-frame of the series is based on (i) an output of the radio link control unit for a second sub-frame preceding the first sub-frame in the series, and (ii) an output of the adaptive filter for the second sub-frame.

2. The radio head of claim 1, wherein the standalone small cell comprises an evolved Node B.

3. The radio head of claim 1, wherein the output of the radio control link comprises an observed sum of packet data convergence protocol bytes received in each of the series of sequential sub-frames.

4. The radio head of claim 3, wherein the output of the radio control link further comprises an ideal bandwidth report and the segmentation induced noise value, and wherein the ideal bandwidth report is equal to a first input to the adaptive filter.

5. The radio head of claim 1, wherein the adaptive filter is configured to output a predicted sum of packet data convergence protocol bytes for each of the series of sequential sub-frames.

6. The radio head of claim 5, wherein the predicted sum of packet data convergence protocol bytes is sent to the backhaul system for each of the series of sequential sub-frames.

7. The radio head of claim 1, wherein the backhaul system comprises a DOCSIS telecommunications standard.

8. The radio head of claim 1, wherein the standalone small cell comprises an uplink user data plane.

9. The radio head of claim 1, further comprising a correlator unit configured to time-correlate the bandwidth report with an egress amount for each of the plurality of sequential sub-frames.

10. The radio head of claim 1, wherein the adaptive filter includes an error function as a second input for the first sub-frame, and wherein the error function is based on the output of the radio link control unit for the second sub-frame minus the output of the adaptive filter for the second sub-frame.

11. The radio head of claim 1, wherein the adaptive filter is further configured to implement a least mean square operation.

12. The radio head of claim 1, wherein the backhaul system further comprises at least one of a packet data convergence protocol unit, a media access control unit, and a physical layer unit.

13. A radio head for a backhaul system, comprising:
a standalone small cell configured to (i) receive a plurality of IP packets over a series of sequential sub-frames, and (ii) generate a bandwidth report for each of the plurality of received IP packets;

a radio link control unit configured to sum a received bandwidth report with a segmentation induced noise value for each of the plurality of received IP packets; and an adaptive filter configured to apply a filter weight to each of the series of sequential sub-frames, wherein the applied filter weight at a first sub-frame of the series is based on (i) an output of the radio link control unit for a second sub-frame preceding the first sub-frame in the series, and (ii) an output of the adaptive filter for the second sub-frame, wherein the adaptive filter includes an error function as a second input for the first sub-frame, and wherein the error function is based on the output of the radio link control unit for the second sub-frame minus the output of the adaptive filter for the second sub-frame, and wherein the filter weight of the adaptive filter is represented by the equation:

$$\hat{h}(n+1)=\hat{h}(n)+\mu e(n)x(n)$$

where $\hat{h}(n+1)$ is the filter weight applied to the present sub-frame n+1, $\hat{h}(n)$ is the filter weight applied to the second sub-frame n, e(n) is the error function from the second sub-frame n, and x(n) is the input from the second sub-frame.

* * * * *